United States Patent [19]

Hibino

[11] Patent Number: 5,636,332
[45] Date of Patent: Jun. 3, 1997

[54] DEVICE FOR CONTROLLING PRINTER POWER DOWN MODE FOR DISPLAY INTENSITY

[75] Inventor: Masaaki Hibino, Yokkaichi, Japan

[73] Assignee: Brother Kogyo Kabushiki Kaisha, Nagoya, Japan

[21] Appl. No.: 462,276

[22] Filed: Jun. 5, 1995

[30] Foreign Application Priority Data

Jun. 6, 1994 [JP] Japan .................................. 6-148511

[51] Int. Cl.$^6$ ................... G06F 3/12; G06F 3/14; G09G 5/10
[52] U.S. Cl. .................... 395/112; 364/707; 345/147
[58] Field of Search .................................. 395/112, 113; 364/707; 345/147, 211, 212

[56] References Cited

U.S. PATENT DOCUMENTS

| | | |
|---|---|---|
| 4,740,096 | 4/1988 | Nakanishi . |
| 5,479,275 | 12/1995 | Abileah . |
| 5,501,534 | 3/1996 | Mizoguchi . |
| 5,532,935 | 7/1996 | Ninomiya et al. ................ 364/707 |

Primary Examiner—Scott A. Rogers
Attorney, Agent, or Firm—Oliff & Berridge

[57] ABSTRACT

A printer setting device connected to a printer for recording, based on print data, characters and other images on a recording sheet, the printer setting device including a display displaying a menu image with various selectable operation modes including a power down mode to reduce power consumption of the printer; and a central control unit outputting a control command for setting the printer to the power down mode when the power down mode is selected on the menu image.

17 Claims, 6 Drawing Sheets

DEVICE FOR CONTROLLING PRINTER POWER DOWN MODE FOR DISPLAY INTENSITY

BACKGROUND OF THE INVENTION

1. Field of the Invention

The present invention relates to a printer setting device connected between a printer, for performing printing operations, and a host computer, for transmitting commands and print data to the printer.

2. Description of the Related Art

Printers, such as laser printers, that are connected to a printer setting device have components which only operate during printing and which are turned off as soon as printing is completed. One example is the main motor for driving rollers to transport the print sheet. On the other hand, other components, such as the thermal fixing unit of the printer, have a long warm-up time so are not turned off directly after printing is completed. In order to reduce power consumption during waiting periods between printing operations, the thermal fixing unit is maintained at a waiting temperature, which is several tens of degrees lower than the temperature required for printing.

However, the thermal fixing unit consumes a great deal of power even by generating this waiting temperature. There has been known a printer that automatically enters a power saving mode, wherein the thermal fixing unit is turned off, when print data is not inputted from a host computer or when an operator does not manipulate any switches on a control panel for a predetermined duration of time. Power consumption is reduced to a minimum by stopping not only power of the main motor and the thermal fixing unit, but also operation of the printer's CPU. This power saving mode is also called a sleep mode. The power saving mode is terminated when the operator manipulates any switch on the control panel or when the printer retrieves input of print data.

The external appearance of the printer is the same when in the power saving mode and when its power is turned off. However, the printer takes longer to start up after having its power turned off than after entering the power saving mode because the printer goes through initialization processes, such as checking its ROM and RAM, directly after its power is turned on.

The power switch of some printers is located at the rear of the printer or some other difficult to reach spot. It is therefore desirable not to have to frequently turn the printer on an off. Also, to reduce costs or simplify the design of the printer, some printers are not provided with power switches.

SUMMARY OF THE INVENTION

As mentioned above, the printer enters the power saving mode only after a predetermined period of time has elapsed after printing has stopped. Therefore, even if a user knows directly after completing a printing operation that he or she will not need to print anything for a long while, the user can not switch the printer into the power saving mode. Power is wasted until the predetermined period of time passes. It is conceivable to add to the control panel a switch for putting the printer into the power saving mode, but such a switch would increase the cost of the device.

It is an objective of the present invention to provide a printer setting device by which, without a special switch being provided to the computer, a user can put the printer into a power saving mode by manipulating the computer when the printer is not in use.

To achieve the above-described objectives, a printer setting device according to one aspect of the present invention includes a display displaying a menu image with various selectable operation modes including a power down mode to reduce power consumption of a printer which is for recording, based on print data, characters and other images on a recording sheet, and which is connected to the printer setting device; and a central control unit outputting a control command for setting the printer to the power down mode when the power down mode is selected on the menu image.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
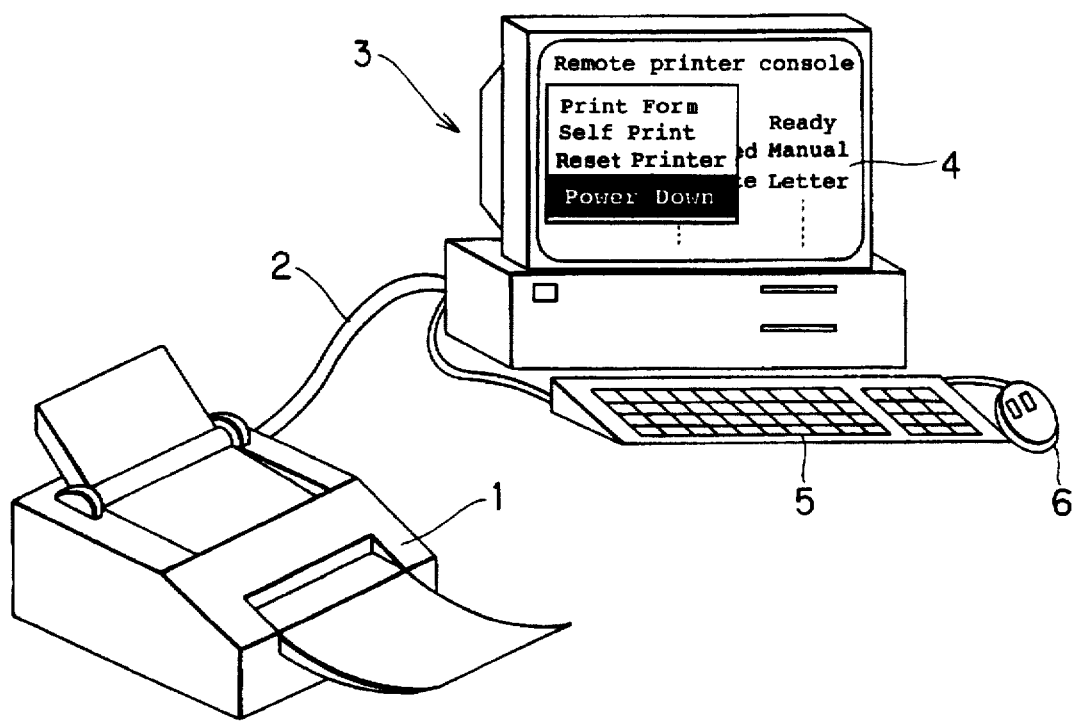
FIG. 1 is an external view of a personal computer and a printer according to an embodiment of the present invention.

A printer setting device according to a preferred embodiment of the present invention will be described while referring to the accompanying drawings wherein like parts and components are designated by the same reference numerals to avoid duplicating description.

FIG. 1 shows a printer 1 connected to a personal computer 3 by a centronics interface (I/F) 2. The personal computer 3 includes a keyboard 5, a mouse 6, and a display 4. Using the keyboard 5, a user can input data and enter various commands, such as for setting the printer 1 to a power saving mode (referred to as printer power down mode hereinafter) to the personal computer 3. Various commands can also be entered to the personal computer 3 by using the mouse 6. The display 4 is for displaying various images, including, as shown in FIG. 1, a menu image with software-generated selection keys, including one for selecting the printer power down mode. A user can select the printer power down mode by operating the keyboard 5 or the mouse 6 while viewing the contents of the menu image displayed by the display 4.

Figure 2:
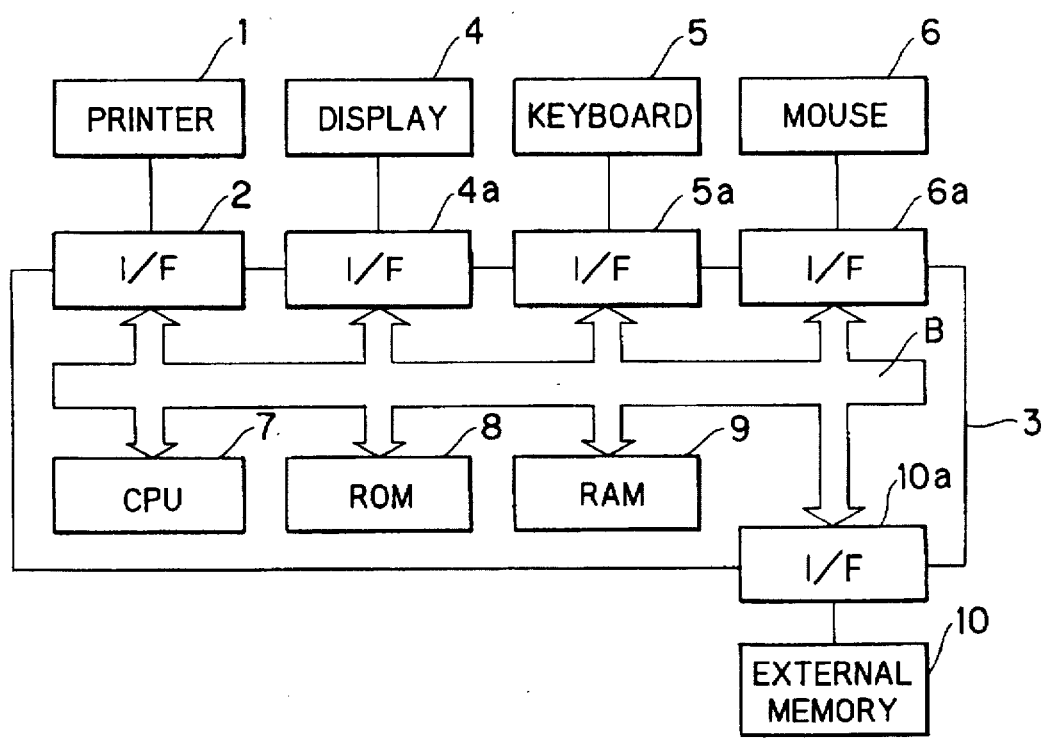
FIG. 2 is a block diagram schematically showing internal components of the personal computer, their interrelationship, and their connection to external components.

As shown in FIG. 2, the printer 1, display 4, the keyboard 5, and the mouse 6 are connected to the personal computer 3 by their interfaces 2, 4a, 5a, and 6a respectively. The personal computer 3 includes internal components such as a CPU 7 for controlling the personal computer 3; a ROM 8 storing various control programs including a remote printer console program (to be described later); and a RAM 9 for temporarily storing data. The interfaces 2, 4a, 5a, and 6a; the CPU 7; the ROM 8; and the RAM 9 are connected to a data bus B. An external memory device 10 such as a floppy disk drive storing programs and various data is provided to the personal computer 3. The external memory device 10 is connected to the data base B by an interface (I/F) 10a. The CPU 7 has a timer function by which passage of time is monitored by counting clock pulses of the CPU 7 based on a program stored in the ROM 8.

Figure 3:
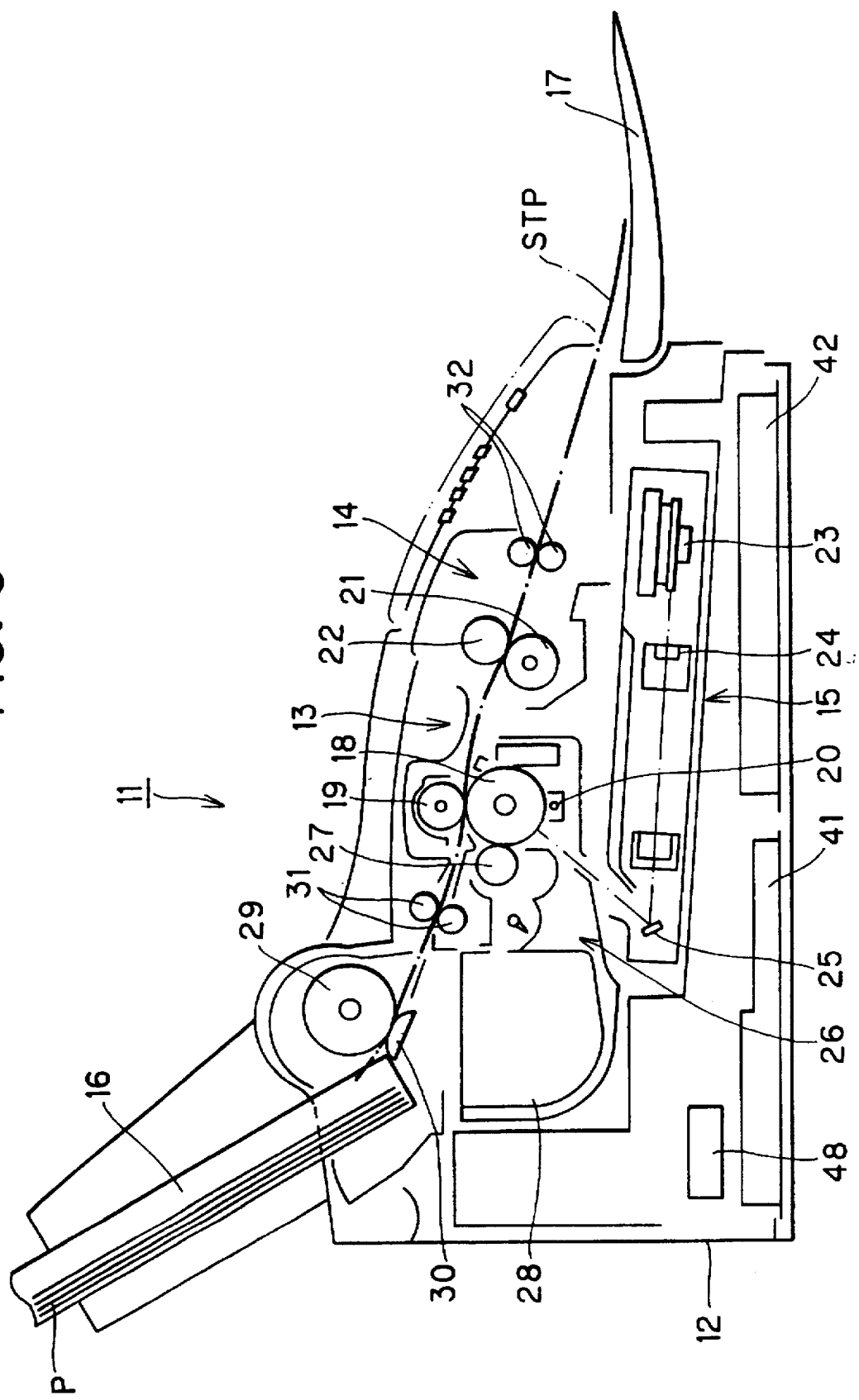
FIG. 3 is a cross-sectional view showing internal components of an example of the printer in FIG. 1.

Next, while referring to FIG. 3, an explanation of a laser printer 11 will be provided as an example of the printer 1. The components of the laser printer 11 are housed in a housing case 12. A sheet-supply cassette 16 filled with sheets of paper P is detachably mounted on the upper rear of the housing case 12 and a sheet discharge tray 17 is pivotally fixed on the front of the housing case 12. Sheets on which images are to be recorded are transported along a sheet transport path STP between the sheet-supply cassette 16 and the sheet discharge tray 17. An opposing sheet-supply roller 29 and separation pad 30, and opposing transporting rollers 31, are disposed on opposite sides of the sheet transport path STP adjacent to the sheet-supply cassette 16. Opposing discharging rollers 32 are disposed on opposite side of the sheet transport path STP adjacent to the sheet discharge tray 17.

A photosensitive unit 13 is disposed downstream from the transporting rollers 31. The photosensitive unit 13 includes an opposing photosensitive drum 18 and transcribing roller 19; and a charger unit 20 for charging the photosensitive drum 18. The photosensitive drum 18 and transcribing roller 19 are disposed on opposite sides of the sheet transport path STP. The charger unit 20 is disposed in confrontation with the photosensitive drum 18.

A developing unit 26 including a developing roller 27 and a toner containing cartridge 28 is provided adjacent to the photosensitive unit 13. The developing roller 27 is positioned in the developing unit 26 in confrontation with the photosensitive drum 18. A laser scanner unit 15 for forming a latent static image on the surface of the photosensitive drum 18 is provided below the photosensitive unit 13. The laser scanner unit 15 includes a laser beam generator 23 and a lens 24. A fixing unit 14 is provided downstream from the photosensitive unit 13. The fixing unit 14 includes an opposing a thermal roller 21 and pressing roller 22 disposed on opposite sides of the sheet transport path STP.

A low-voltage power source 48, a control circuit board 41, and a driver board 42 are housed in the housing case 12. Some components of the laser printer 11, such as a main motor 43 for driving the photosensitive drum 18, have been omitted from FIG. 3.

Next, an explanation of printing operations by the laser printer 11 will be provided. A recording sheet P is removed from the sheet-supply cassette 16 by rotation of the sheet-supply roller 29 against the separation pad 30 and transported along the sheet transport path STP and between the photosensitive drum 18 and the transcribing roller 19 by the transporting rollers 31. The laser scanner unit 15 forms a latent static image on the surface of the photosensitive drum 18 by irradiating the surface of the photosensitive drum 18 with a laser beam based on image data transmitted from the personal computer 3. The latent static image is developed into a visible toner image by the developing unit 26. The visible toner image is transcribed to the surface of the recording sheet P by the transcribing roller 19 and fixed there by the fixing unit 14. The recording sheet P is discharged from the laser printer 11 by the discharging roller 32 onto the sheet discharge tray 17.

Figure 4:
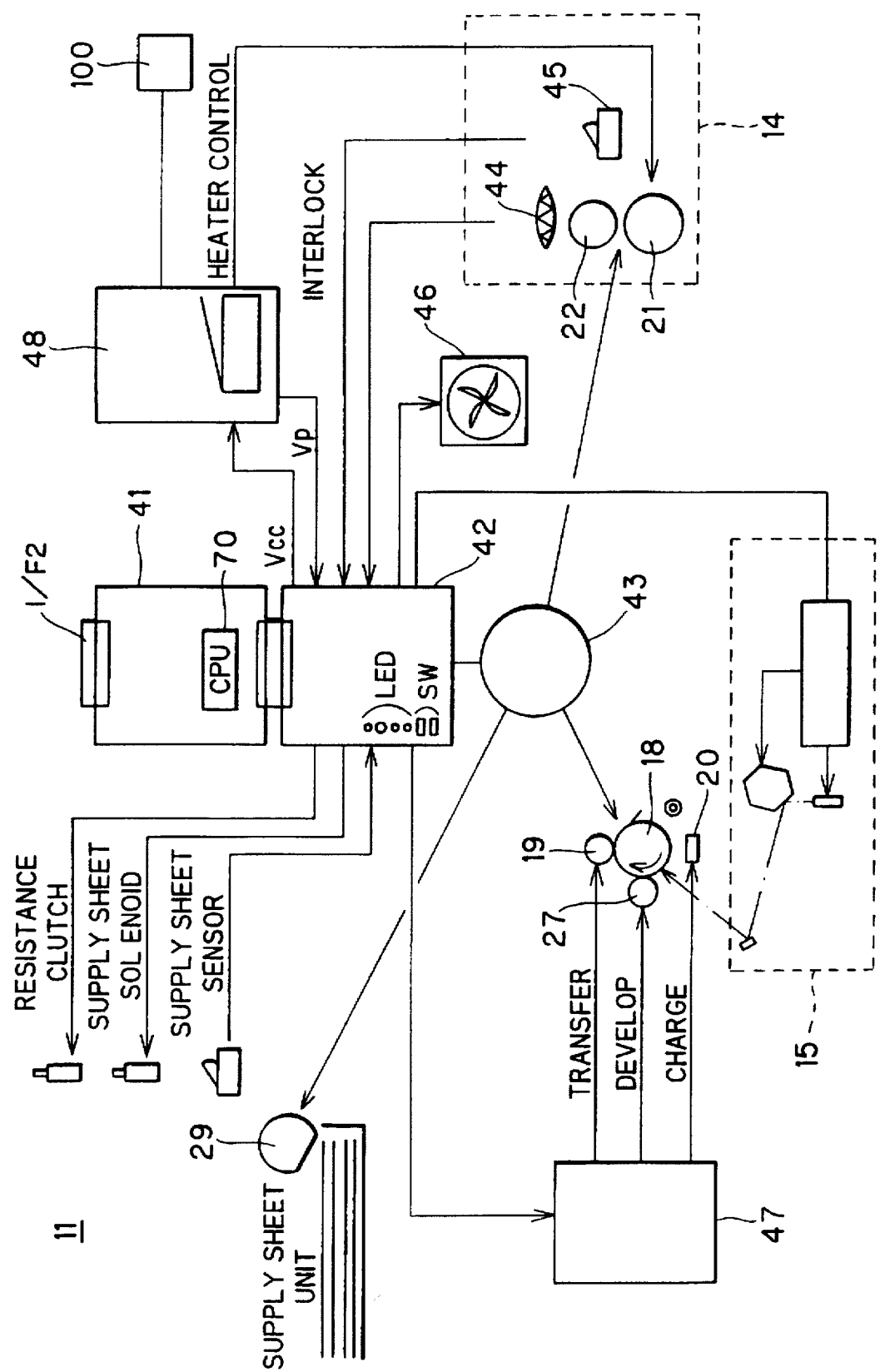
FIG. 4 is a schematic view showing interconnection of components of the printer of FIG. 3.

FIG. 4 schematically shows interrelation of components in the laser printer 11. As shown in FIG. 4, the printer 11 includes a main board 41 in which is located a CPU 70 and which is connected to the interface 2 of the personal computer 3; and a driver panel 42 having light emitting diodes LED, for indicating the status of the laser printer 11, and control switches SW, that an operator operates to, for example, compel discharge of a recording sheet P, or select font or sheet size. The driver panel 42 is connected to a resistance clutch, a sheet-supply solenoid, and a sheet-supply sensor. The personal computer 3 transmits signals for controlling the laser printer 11 to the CPU 70 over the interface 2. The signals are further transmitted from the CPU 70 to the circuitry of the driver panel 42.

A main motor 43 for driving various components of the laser printer 11 is mechanically connected directly or by gear trains (not shown) to those components and electrically connected to the driver panel 42. To transport a recording sheet P, the rotation of the motor is transmitted for driving the photosensitive drum 18, the transcribing roller 19, the developing roller 27, the thermal roller 21 of the fixing unit 14, and the sheet-supply roller.

The low-voltage power source 48 is connected to an external power source 100 such as a wall outlet. The low-voltage power source 48 supplies power to the driver panel 42 and controls heating of the thermal roller 21 in the fixing unit 14. The low-voltage power source 48 includes an interlock switch for cutting off power to the thermal roller 21 when the cover of the laser printer 11 is open. A high-voltage power source 47 is provided for supplying high voltage to the transcribing roller 19, the developing roller 27, and the charger unit 20 as controlled by the driver panel 42.

A sheet discharge sensor 45 and a well-known temperature sensor 44 for detecting temperature are also provided to the fixing unit 14. The sheet discharge sensor 45 and the temperature sensor 44 are electrically connected with the driver panel 42 and transmit signals thereto. A cooling fan 46 for cooling the laser printer 11 is provided electrically connected to the driver panel 42. The cooling fan 46 is controlled by the driver panel 42.

Figure 5:
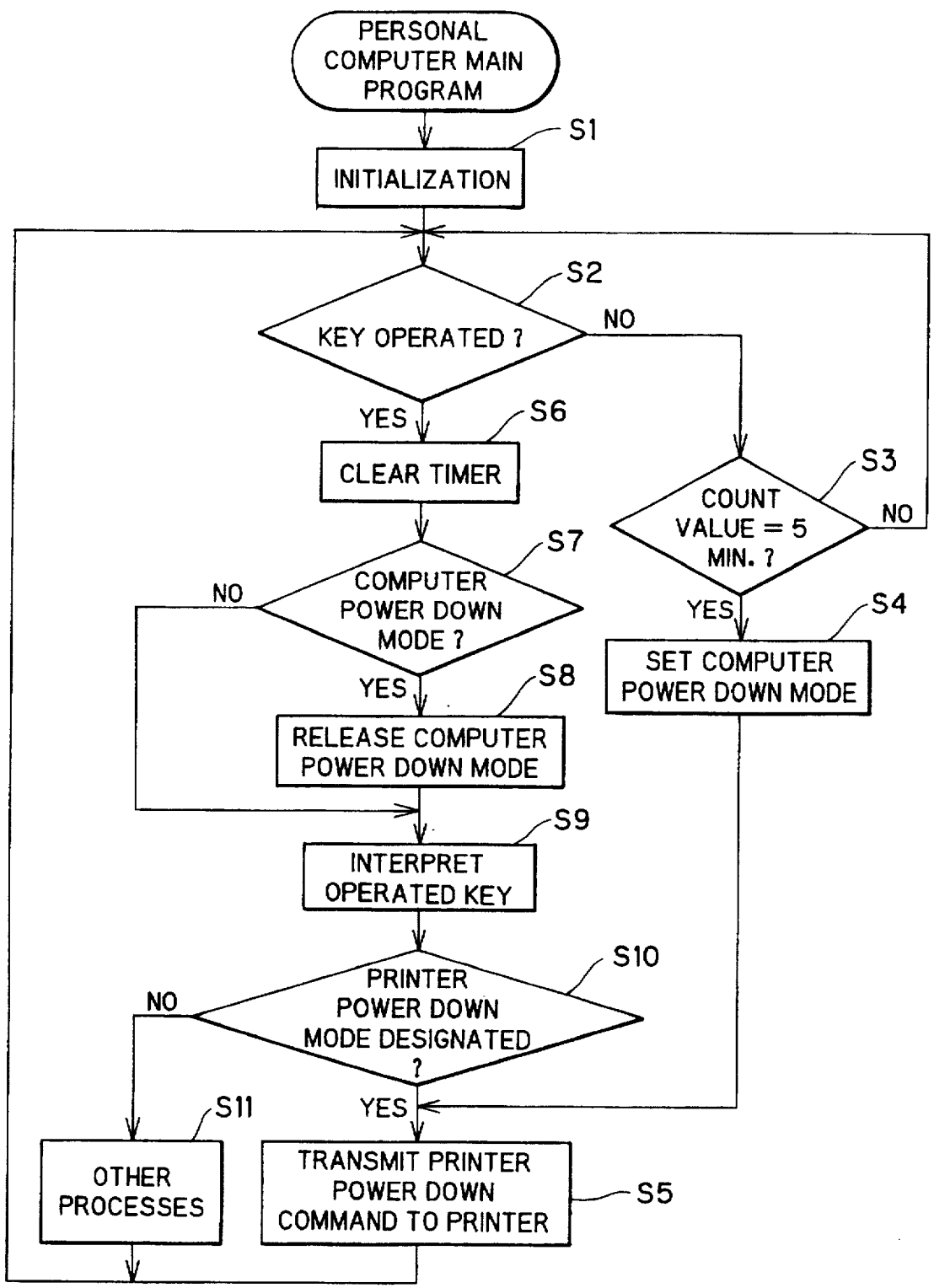
FIG. 5 is a flowchart representing a main program run by a central control unit of the personal computer of FIG. 1.

FIG. 5 is a flowchart representing processes performed in the personal computer 3 at the start of a remote printer console program for setting operation mode of the printer 1 from the personal computer 3. When the remote printer console program is started, in step 1, the CPU 7 performs initialization processes such as resetting the timer count value to zero. Hereinafter, steps will be referred to as Si, wherein i is the number of the step. Then, whether or not the mouse 6 or a key of the keyboard 5 have been operated is determined in S2. If not (i.e., S2 is NO), then the timer count value is checked in S3. If the count value has not reached a predetermined duration of time (five minutes in this example) so that S3 is NO, the program returns to S2. When the count value has reached five minutes (i.e., S3 is YES), the CPU 7 in S4 enters the personal computer 3 into a computer power down mode, thereby activating a screen saving function which reduces the intensity of the display 4 as will be described later. Next, via the interface 2, the CPU 7 outputs to the printer 1 in S5 a power down command for putting the printer 1 into the printer power down mode. The program then returns to S2. Therefore, unless an operator operates the personal computer 3 using the keyboard 5 or the mouse 6 before the predetermined duration of time elapses (i.e., before S2 is NO and S3 is YES), then the computer 3 will be put into the computer power down mode and the printer 1 will be set to the printer power down mode. The predetermined duration of time for determining when the personal computer 3 is automatically set to the computer power down mode, whereupon the command for putting the printer 1 into the printer power down mode will be transmitted, is not limited to a five minute interval. The printer setting device can be designed so that an operator can freely lengthen or shorten the predetermined duration of time to suit his or her needs. An explanation of operations performed in the printer 1 when the personal computer 3 outputs the power down mode command to the printer 1 will be provided later while referring to the flowchart in FIG. 6.

If the operator inputs data using the keyboard 5 or the mouse 6 (i.e., S2 is YES), the CPU 7 resets the count value of the timer to zero in S6 and then determines in S7 whether or not the personal computer 3 is presently set to the computer power down mode. If the personal computer 3 is set to the computer power down mode (i.e., S7 is YES), the personal computer 3 is brought out of the computer power down mode in S8 and the data inputted in S2 from the keyboard 5 or the mouse 6 is interpreted in S9. If, in S7, the computer power down mode is determined not to be set (i.e., S7 is NO), the program proceeds directly to S9, where data inputted in S2 from the keyboard 5 or the mouse 6 is interpreted. Based on the interpretation made in S9, it is determined in S10 whether or not the inputted data is a command to put the printer 1 into the printer power down mode. Such a command can be entered by a user selecting the software-generated selection key of the menu image for the printer power down mode as described earlier. If the inputted data is a printer power down mode command (i.e., S10 is YES), the CPU 7 transmits a printer power down command to the printer 1 via the interface 2 in S5. If not (i.e., S10 is NO), then the processes appropriate for the inputted data are performed in S11. After the processes appropriate for S5 or S11 are completed, the program returns to S2.

Figure 6:
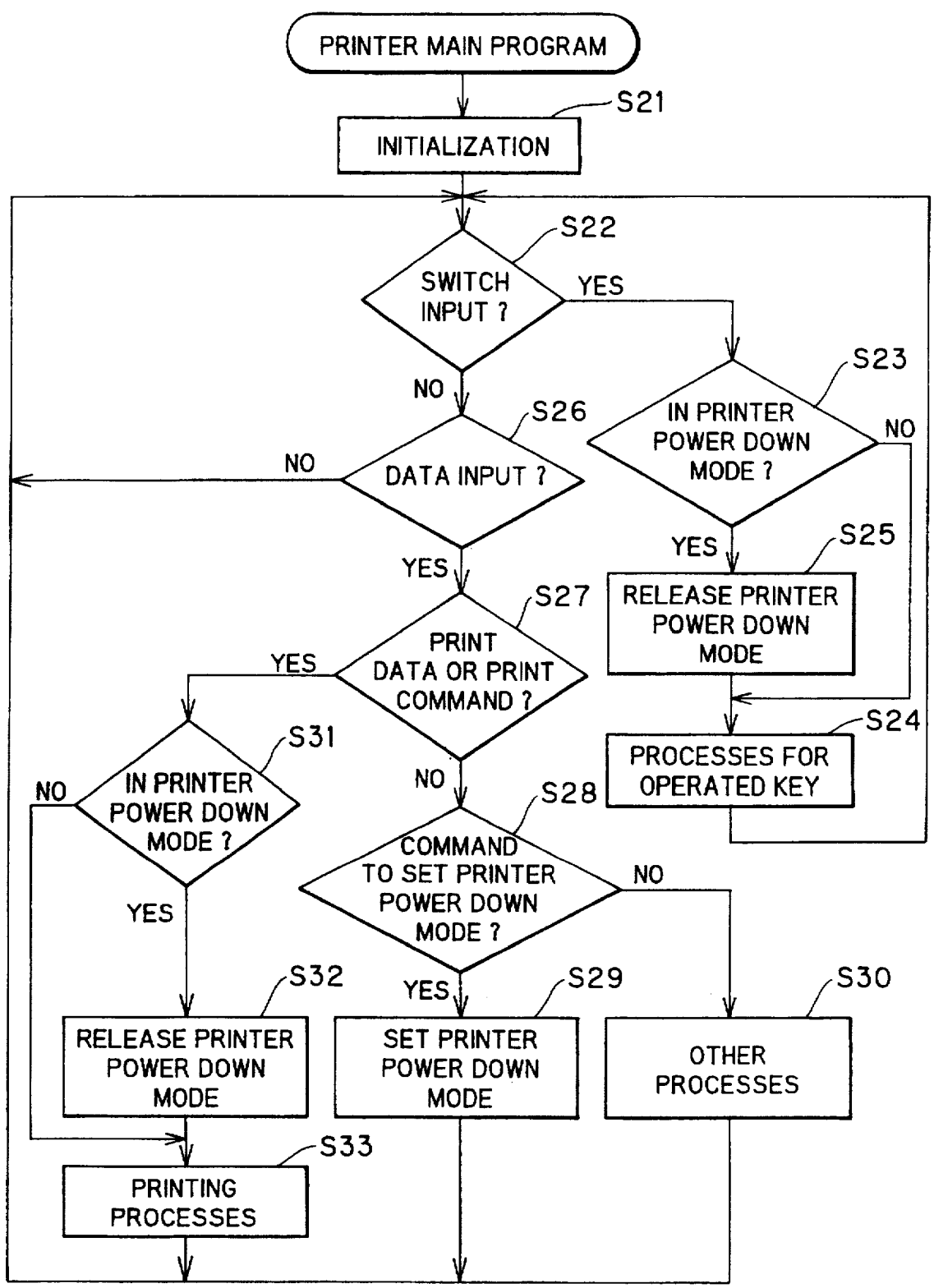
FIG. 6 is a flowchart representing a main program run by a central control unit of the printer of FIG. 1.

FIG. 6 is a flowchart representing processes performed at the printer 1. The CPU 70 mounted on the main board 41 of the printer 1 first executes initialization processes in S21. Then, the CPU 70 determines whether or not one of the control switches SW was operated in S22. If so (i.e., S22 is YES), whether or not the printer 1 is presently in the printer power down mode is determined in S23. If so (i.e., S23 is YES), operations to bring the printer 1 out of the printer power down mode are performed in S25 and the processes corresponding to the operated switch SW are performed in S24. If the printer 1 is not set to the printer power down mode (i.e., S23 is NO), the program proceeds directly to S24, where the processes corresponding to the operated switch SW are performed. Afterward, the program returns to S22.

On the other hand, if no data is inputted from a control switch SW (i.e., S22 is NO), the CPU 70 determines in S26 whether or not any data is being inputted from the personal computer 3. If not (i.e., S26 is NO), the program returns to S22. If so (i.e., S26 is YES), whether or not the inputted data is a print command or data used in printing is determined in S27. If not (i.e., S27 is NO), whether or not the data is a command for setting the printer 1 into the printer power down mode sent to the printer 1 in S5 of FIG. 5 is determined in S28. If the data is the command for setting the printer 1 to the printer power down mode (i.e., S28 is YES), then the printer 1 is set to the printer power down mode in S29 and the program returns to S22.

In the printer power down mode, the CPU 70 cuts off power supply to components of the printer 1, such as the fixing unit 14, the sheet-supply roller 29, the laser scanner unit 15, and the main motor 43. The CPU 70 itself then enters into a mode with relatively little activity, thereby reducing consumption of power to a minimum. However, the CPU 70 still receives power during the printing power down mode. Therefore, the CPU 70 can make the determinations in S22, S26, and S27 when a control switch SW is operated or when data is inputted from the personal computer 3.

If the command for setting the printer 1 into the printer power down mode is determined in S28 not to have been inputted, then the processes appropriate for the inputted command are performed in S30 and the program returns to S22.

If, in S27, it is determined that a print command or data used in printing has been inputted from the personal computer 3 (i.e., S27 is YES), whether or not the printer is presently set in the printed power down mode is determined in S31. If so (i.e., S31 is YES), the printer 1 is brought out of the printer power down mode in S32, printing processes appropriate for the inputted data are performed in S33, and the program returns to S22. When the printer 1 is brought out of the printer power down mode, the CPU 70 starts operating and restarts supply of power to the fixing unit 14, the sheet-supply roller 29, the laser scanner unit 15, the main motor 43, and the like. If it is determined in S31 that the printer 1 is not set to the printer power down mode (i.e., S31 is NO), the printing processes appropriate for the inputted data are performed in S33 and the program returns to S22.

The display 4 is provided with an image saving function which either reduces power to the display 4 or, when no keys are operated over a predetermined duration of time, reduces the intensity of the image and displays a faint pattern or an animated image to show that the display 4 is in a hold condition. In the present embodiment, when the CPU 7 enters the personal computer 3 into the computer power down mode in S4 of FIG. 5, the image saving function is also activated so that the appearance of the display 4 changes. For example, the intensity of the display 4 can be reduced. Afterward, the original image can be reinstated (for example, in S8 of the flowchart in FIG. 5) when the user operates the mouse 6 or a key of the keyboard 5.

The personal computer main program could be modified so that when the personal computer 3 is set to the computer power down mode, which results in the display 4 darkening and the printer 1 being set to the printer power down mode, a menu is displayed on the display 4 with an option for disengaging the personal computer 3 from the computer power down mode. When the disengage option of the menu is chosen, the personal computer 3 is brought out of the computer power down mode, whereupon the display 4 returns to its original image and intensity. Processes for displaying the disengagement menu on the display 4 could be performed in S4 with processes for setting the computer power down mode. Processes for disengaging the personal computer 3 from the computer power down mode, thereby brightening the display 4, can be performed as one of the other processes represented in S11. In this case, a YES determination of whether a disengagement command had been received by the CPU 7 would result in processes for bringing the personal computer 3 out of the computer power down mode being performed.

Alternatively, the disengagement menu could include a prompt for disengaging the printer 1 from the printer power down mode when the printer 1 set to printer power down mode. The personal computer main program could be modified so that selecting this option would bring the printer 1 out of the printer power down mode and also in the display 4 retaining its original intensity.

Figure 7:
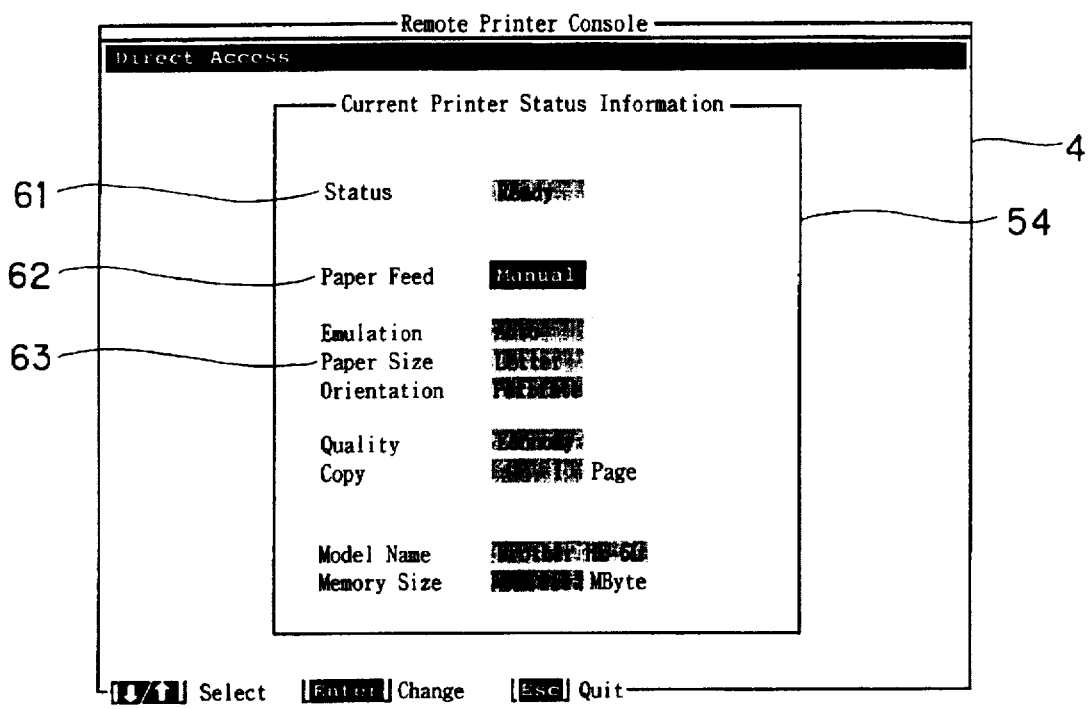
FIG. 7 shows a menu image displayed on a display of the personal computer of FIG. 1.

FIG. 7 shows the display 4 displaying a menu image 54 generated in processes performed in S11 of the flowchart in FIG. 5. While the display 4 displays the menu image 54, the CPU 7 obtains information on the present settings and displays the information on the menu image 54 of the display 4. The operator can change settings on the menu image 54 of the display 4 using the keyboard 5 or the mouse 6. The menu image 54 serves as a console for the remote printer and includes categories such as the printer status 61, the paper feed mode 62, and the print sheet size 63. In the example shown in FIG. 7, the printer status 61 indicates "READY" to show that bidirectional transmission between the printer 1 and the personal computer 3 is possible; the paper feed mode 62 indicates "MANUAL" to show that sheets are to be manually fed into the printer 1; and the print sheet size 63 indicates "LETTER" to show that the printer 1 is set up to print on letter-sized sheets. The category selected by the operator using the mouse 6 or the cursor keys of the keyboard 5 is displayed in white with a black background. In this example, an operator has selected the category of the paper feed mode 62, so that "MANUAL" is displayed in white with a black background.

Figure 8:
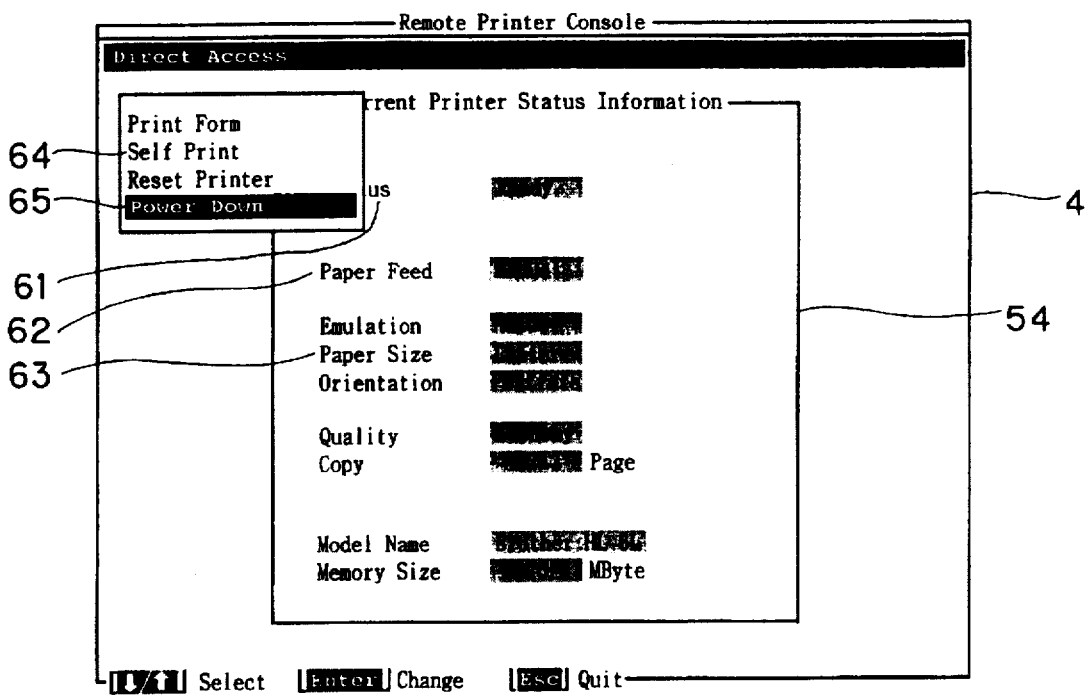
FIG. 8 shows a pop-up menu image displayed on the display of FIG. 7.

FIG. 8 shows the display 4 displaying a pop-up menu 64 including a power down selection key. The operator can use the keyboard 5 or the mouse 6 to cause the pop-up menu 64 to appear on the display 4. A plurality of software-generated selection keys for selecting the print mode of the printer 1 are displayed on the pop-up menu 64. A power down selection key 65 appearing as "Power Down" on the pop-up menu 64 is included in these selection keys or options. When the operator selects the power down selection key 65 using the mouse 6 or the cursor keys of the keyboard 5, the display of "Power Down" appears in white characters on a black field. When the operator presses an execution key (such as an enter key) while the image is in this condition, in S9 of the flowchart of FIG. 5, the CPU 7 will interpret the manipulated key as being for designating the printer power down mode. Therefore, the determination in S10 will be YES, so that the command for setting the printer 1 into the printer power down mode is outputted as indicated in S5 of the flowchart of FIG. 5. The printer 1 is compelled to enter the printer power down mode, resulting in various power consuming components of the printer 1 being shut down.

While the invention has been described in detail with reference to specific embodiments thereof, it would be apparent to those skilled in the art that various changes and modifications may be made therein without departing from the spirit of the invention, the scope of which is defined by the attached claims.

For example, the printer setting device connected to the printer 1 need not be a personal computer 3, but could instead be a large host computer or a control panel used solely for the printer. Also, the menu image 54 could display various other types of information on the current status of the printer 1 than the information described in the embodiment.

Also, the program could be designed so that when the power down command is outputted to the printer 1 in S5, the personal computer 3 is set to the computer power down mode also in S5, whereupon intensity of the display 4 is darkened by the save image function. In this case, the personal computer 3 would be released from the computer power down mode in S8, so that the original intensity of the display 4 is reinstated, by operation of the mouse 6 or a key of the keyboard 5. However, the printer 1 would remain in the printer power down mode until print data or a print command is transmitted from the personal computer 3. For example, when an operator presses an execution key while the pop-up menu 65 is displayed as shown in FIG. 8, the command for setting the printer 1 into the printer power down mode is outputted to the printer 1 and the display 4 will darken. The display 4 will return to its original intensity when the mouse 6 or a key of the keyboard 5 is operated.

The present invention allows a user to willfully designate and select a printer power down mode for reducing power consumption of the printer 1. When the user selects the printer power down mode, the CPU 7 outputs to the printer 1 a command for setting the printer power down mode. The user can put the printer into the printer power down mode at any time, so that power is not wasted before the predetermined duration of time elapses. Therefore, power consumption of the printer 1 can be reduced. Also, the present invention eliminates the need to provide a separate switch for entering the printer 1 into the printer power down mode, thereby reducing production costs to less than required for conventional printer setting devices. The present invention also allows an operator to select the printer power down mode using a menu style image.

When the printer setting device according to the present invention sets the printer 1 to the power down mode, the intensity of the display is preferably reduced so that power is further saved. This is executed by the CPU 7 reducing intensity of the display 4 in association with outputting a command to the printer 1 to put the printer 1 in the power down mode.

When a user designates to bring the printer 1 out of the printer power down mode, such as by manipulating the mouse 6 or keys on the keyboard 5, the CPU 7 outputs a command to bring the printer 1 out of the power down mode and the display 4 is automatically returned to its original intensity. This simplifies operations to bring the printer 1 out of the power down mode so that the printer setting device is easier to use.

What is claimed is:

1. A printer controlling device connected to a printer for recording, based on print data, characters and other images on a recording sheet, the printer controlling device comprising:
    mode designating means for designating various operation modes including a power down mode for reducing power consumption of the printer;
    mode controlling means for outputting a control command for controlling the printer to the power down mode when the power down mode is designated by the mode designating means;
    a display for displaying a menu image by which the power down mode is selected for designation by the mode designating means; and
    display controlling means for reducing intensity of the display from an original intensity to a reduced intensity when the control command is outputted from the mode controlling means.

2. A printer controlling device as claimed in claim 1 wherein, when disengagement of the printer from the power down mode is designating by the mode designation means, the mode controlling means outputs a control command for disengaging the printer from the power down mode and the display controlling means returns the display to the original intensity.

3. A printer controlling device as claimed in claim 2 wherein, when the printer is in the power down mode, the mode designating means displays on the display a disengagement menu image by which disengagement of the printer from the power down mode is selected.

4. A printer controlling device as claimed in claim 1 wherein, when the printer is in the power down mode, the mode designating means displays on the display a disengagement menu image by which disengagement of the printer from the power down mode is selected.

5. A printer controlling device as claimed in claim 1 wherein the printer is released from the power down mode when the printer controlling device transmits print data to the printer.

6. A printer controlling device connected to a printer for recording, based on print data, characters and other images on a recording sheet, the printer controlling device comprising:

a display displaying a menu image with various selectable operation modes including a power down mode to reduce power consumption of the printer;

a central control unit outputting a control command for controlling the printer to the power down mode when the power down mode is selected on the menu image; and wherein the central control unit reduces intensity of the display from an original intensity to a reduced intensity when the control command is outputted for controlling the printer to the power down mode.

7. A printer controlling device as claimed in claim 6 wherein, when the printer is in the power down mode, the central control unit displays on the display a disengagement menu image by which disengagement of the printer from the power down mode is selected.

8. A printer controlling device as claimed in claim 7 wherein the central control unit returns the display to the original intensity and disengages the printer from the power down mode when disengagement from the power down mode is selected.

9. A printer controlling device as claimed in claim 6 wherein the central control unit returns the display to the original intensity and disengages the printer from the power down mode when the central control unit designates disengagement from the power down mode.

10. A printer controlling device as claimed in claim 6 wherein, when the printer is in the power down mode, the central control unit displays on the display a disengagement menu image by which disengagement of the printer from the power down mode is selected.

11. A printer controlling device as claimed in claim 6, wherein the printer is released from the power down mode when the printer controlling device transmits print command to the printer.

12. A method for controlling a printer for recording, based on print data, characters and other images on a recording sheet, the method comprising the steps of:

displaying on a display a menu image with various selectable operation modes including a power down mode to reduce power consumption of the printer;

outputting from a central control unit a control command for controlling the printer to the power down mode when the power down mode is selected on the menu image; and further comprising the step of controlling the central control unit to reduce intensity of the display from an original intensity to a reduced intensity when the control command is outputted for controlling the printer to the power down mode.

13. A method for controlling a printer as claimed in claim 12 further comprising the step of, when the printer is in the power down mode, controlling the central control unit to display on the display a disengagement menu image by which disengagement of the printer from the power down mode is selected.

14. A method for controlling a printer as claimed in claim 13 further comprising the step of controlling the central control unit to return the display to the original intensity and disengaging the printer from the power down mode when disengagement from the power down mode is selected.

15. A method for controlling a printer as claimed in claim 12 further comprising the step of controlling the central control unit return the display to the original intensity and disengage the printer from the power down mode when the central control unit designates disengagement from the power down mode.

16. A method for controlling a printer as claimed in claim 12 further comprising the step of, when the printer is in the power down mode, controlling the central control unit to display on the display a disengagement menu image by which disengagement of the printer from the power down mode is selected.

17. A method for controlling a printer as claimed in claim 12, further comprising the step of releasing the printer from the power down mode when print data is transmitted to the printer.

* * * * *

UNITED STATES PATENT AND TRADEMARK OFFICE
CERTIFICATE OF CORRECTION

PATENT NO. :  5,636,332
DATED      :  June 3, 1997
INVENTOR(S):  Masaaki HIBINO

It is certified that error appears in the above-indentified patent and that said Letters Patent is hereby corrected as shown below:

On the title page, item [54] and Col. 1, line 2, should read

-- DEVICE FOR CONTROLLING PRINTER POWER
   DOWN MODE AND DISPLAY INTENSITY --

Signed and Sealed this

Nineteenth Day of August, 1997

Attest:

BRUCE LEHMAN

Attesting Officer

Commissioner of Patents and Trademarks